United States Patent [19]
Nakata

[11] Patent Number: 4,725,740
[45] Date of Patent: Feb. 16, 1988

[54] DC-AC CONVERTING ARRANGEMENT FOR PHOTOVOLTAIC SYSTEM

[75] Inventor: Yukihiko Nakata, Nara, Japan

[73] Assignee: Sharp Kabushiki Kaisha, Osaka, Japan

[21] Appl. No.: 768,566

[22] Filed: Aug. 23, 1985

[30] Foreign Application Priority Data

Aug. 23, 1984 [JP] Japan ................. 59-176919

[51] Int. Cl.$^4$ .................................................. H02J 9/00
[52] U.S. Cl. .......................................... 307/64; 307/66; 307/46; 307/45
[58] Field of Search ................ 363/13, 74, 95, 96, 363/97, 55; 361/93; 307/64, 66, 46, 45

[56] References Cited

U.S. PATENT DOCUMENTS

| | | | |
|---|---|---|---|
| 3,214,672 | 10/1965 | Watkins | 363/96 X |
| 3,657,631 | 4/1972 | Martens et al. | 363/26 |
| 3,820,006 | 6/1974 | Phillips | 363/96 |
| 3,821,632 | 6/1974 | Rylicki | 363/96 |
| 3,939,392 | 2/1976 | Chalmers et al. | 363/96 |
| 4,159,515 | 6/1979 | Walkowiak | 363/96 X |
| 4,375,662 | 3/1983 | Baker | 363/95 |
| 4,555,750 | 11/1985 | Matsumura et al. | 363/96 X |

Primary Examiner—William M. Shoop, Jr.
Assistant Examiner—Sharon D. Logan
Attorney, Agent, or Firm—Birch, Stewart, Kolasch & Birch

[57] ABSTRACT

An improved DC-AC converting arrangement for a photovoltaic system, which makes it possible to supply power at high efficiency by providing a driving control system arranged to stop operation of a DC-AC converter when a load power of the DC-AC converter falls below a predetermined reference value, and to restart the operation of the DC-AC converter when the load power exceeds the predetermined reference value.

4 Claims, 3 Drawing Figures

DC-AC CONVERTING ARRANGEMENT FOR PHOTOVOLTAIC SYSTEM

BACKGROUND OF THE INVENTION

The present invention generally relates to an electric power-generation system and more particularly, to a DC-AC converting arrangement for a photovoltaic system.

For a photovoltaic system which obtains an electric power, for example, from sun light, there has been known a construction which is so arranged as shown in FIG. 1. An electromotive force produced by a solar cells array S is led, through a charge-discharge control unit D, to a storage battery V and a DC-AC converter C where it is converted from DC current to AC current so as to be subsequently fed to a load L through a switching device F. The charge-discharge control unit D has a control function for properly changing over between the charging and discharging state of the storage battery V, while the switching device F is adapted to selectively connect a commercial power supply system P or the photovoltaic system as a power supply source to the load L.

In the conventional photovoltaic system as described above, the DC-AC converter (inverter) C has output-efficiency characteristics as shown in FIG. 3, in which the efficiency is largely varied by the output power, with a marked deterioration of efficiency when in a state of low output. This is attributable to the fact that, even upon lowering of an output power, loss that occurs in a control and in various elements, within the DC-AC converter is not reduced in proportion thereto. Accordingly, in a conventional photovoltaic system, when it becomes inevitable to supply power at a low load factor, the electric power generated by the solar cells array is to be supplied from the DC-AC converting arrangement under a state with a very low efficiency, thus resulting in a wasteful loss of power. In the diagram of FIG. 3, the normal operating range of the DC-AC converter is represented by a symbol W. Moreover, the DC-AC converting arrangement is continuously operated under no load, even when the load becomes zero, and thus, the power produced by the photovoltaic system is undesirably consumed at the control circuit and at the various other elements.

SUMMARY OF THE INVENTION

Accordingly, an essential object of the present invention is to provide an improved DC-AC converting arrangement for a photovoltaic system, which makes it possible to supply power at high efficiency by providing a driving control system arranged to stop operation of a DC-AC converter when a load power of the DC-AC converter falls below a predetermined reference value, and to restart the operation of the DC-AC converter when the load power thereof exceeds the predetermined reference value.

Another important object of the present invention is to provide a DC-AC converting arrangement of the above described type which is simple in construction and stable in operation, and can be readily incorporated into various photovoltaic systems at low cost.

In accomplishing these and other objects, according to one preferred embodiment of the present invention, there is provided a DC-AC converting arrangement for a photovoltaic system, which includes a DC-AC converting section for producing an output by subjecting a DC elecric power from a solar cell array to a DC-AC conversion, a detecting means provided to detect the output value of said DC-AC converting section, and an operation control means coupled to said DC-AC converting section and arranged to stop operation of said DC-AC converting section at a time point when the output value of said DC-AC converting section is lowered below a predetermined reference value.

By the arrangement according to the present invention as described above, an improved DC-AC converting arrangement for a photovoltaic system has been advantageously provided through simple construction at low cost.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
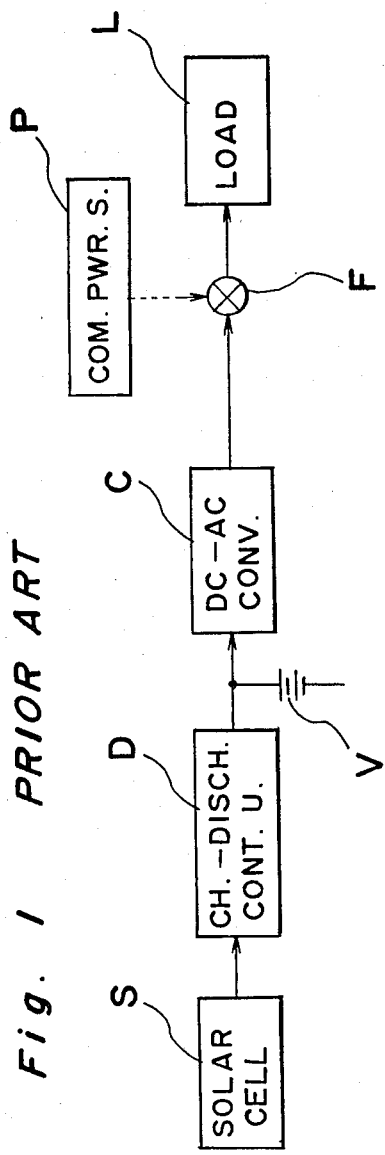
FIG. 1 is a block diagram showing a general construction of a conventional photovoltaic system (already referred to)

Before the description of the present invention proceeds, it is to be noted that like parts are designated by like reference numerals throughout the accompanying drawings.

Referring now to the drawings, there is shown in FIG. 1 a general construction of a photovoltaic system to which a DC-AC converting arrangement according to one preferred embodiment of the present invention is applied.

Figure 2:
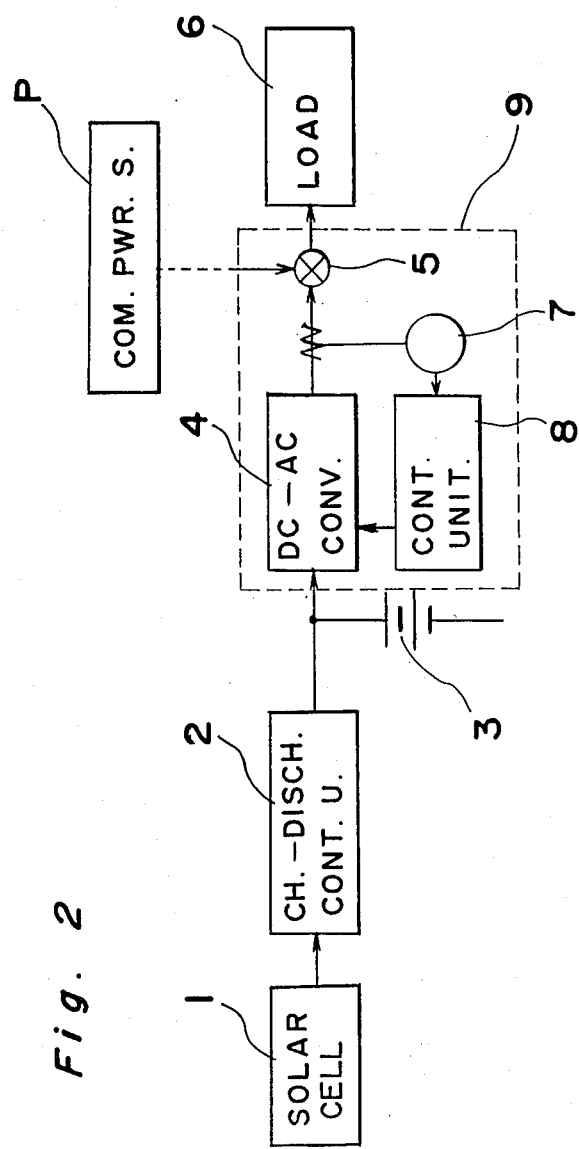
FIG. 2 is a block diagram showing a general construction of a photovoltaic system to which a DC-AC converting arrangement according to one preferred embodiment of the present invention is applied.
Figure 3:
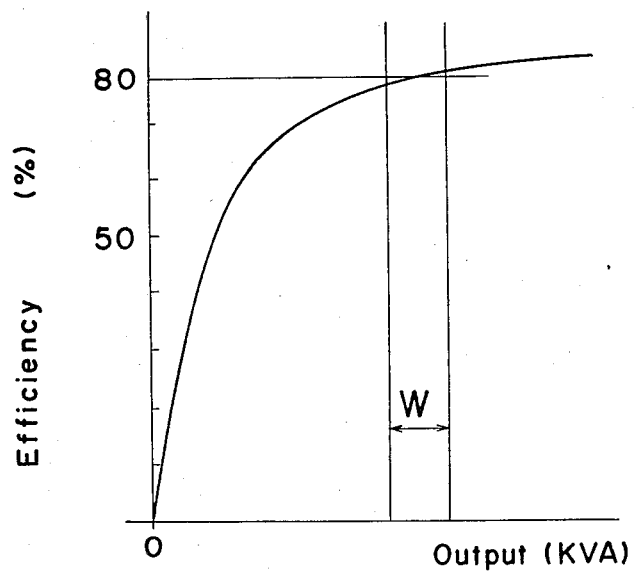
FIG. 3 is a diagram showing output-efficiency characteristics of the DC-AC converting arrangement according to the present invention.

In FIG. 2, the photovoltaic system includes a solar cell array 1 connected to a charge-discharge control unit 2 which is in turn connected to a storage battery 3 and a DC-AC converting section 4. The DC-AC converting section 4 is further connected to a load 6 through a switching device 5, while a control unit 8 is coupled to the DC-AC converting section 4 through a detector 7, and the DC-AC converting arrangement 9 surrounded by dotted lines and directly related to the present invention is constituted by the DC-AC converting section 4, change-over device 5, detector 7 and the control unit 8 for connecting the power source with the load 6.

At the solar battery 1, a DC electric power is produced by the irradiation of natural light so as to be applied to the storage battery 3 and the DC-AC converting section 4 through the charge-discharge control unit 2 in a similar manner as in the conventional arrangement. The charge-discharge control unit 2 monitors the state of charging and discharging so as to avoid over-charging or over-discharging of the storage battery 3, and in the over-discharging state, the control unit 2 closes a supply passage to the DC-AC converting section 4 to establish a charging mode, while upon approach to the over-charging state, it closes the supply passage from the solar cells array 1 to establish a discharging mode. The output voltage converted from DC voltage to AC voltage at the DC-AC converting station 4, is supplied to the load 6 through the switching device 5. The switching device 5 selects the commercial power source P or the photovoltaic system for connection with the load 6. Moreover, between the DC-AC converting section 4 and the switching device 5, the detector 7 for detecting the power value produced from the DC-AC convertng section 4, and the control unit 8 for controlling operation of the DC-AC converting section 4 according to the output signal of the detector 7, are additionally provided for the DC-AC converting section 4.

By the above construction, a sufficient electric power can be obtained by the solar cell array 1 during fine weather, and is fed to the load 6 through the DC-AC converting arrangement 9. On the other hand, during cloudy weather, since the electric power by the solar cell array 1 is reduced, electric power accumulated in the storage battery 3 is also combined so as to be supplied to the load 6 through the DC-AC converting arrangement 9. When such a state continues for a long period of time, with a consequent reduction of the electric power in the storage battery, the operation of the DC-AC converting section 4 is suspended and the switching device 5 is actuated for change-over of connection of the load 6 to commercial power source P. More specifically, when the electric power to be supplied to the load 6 is reduced as compared with the capacity of the DC-AC converting arrangement 9, the efficiency of the DC-AC converter is dramatically reduced as described earlier, and therefore, the DC-AC converting section 4 is immediately suspended to change over the storage battery 3 into the charging mode, while the necessary electric power is supplied to the load 6 from the commercial power source P. The electric energy supplied from the DC-AC converting arrangement 9 to the load 6 is detected by the detector 7, while the detection signal from the detector 7 is applied to the control unit 8. Upon receipt of this detection signal, the control unit 8 sends out a suspension signal to the DC-AC converting section 4 in the case where the power supplied to the load 6 is lower than the preset reference value so as to bring the DC-AC converting section 4 into the suspended state. Subsequently, upon progress of charging for the storage battery 3 into a state capable of raising the supplied power over the preset reference value, the control unit 8 sends out the operation signal to the DC-AC converting section 4 to resume the operation. In this case, the reference value at the time of output of the suspension signal, and the reference value at the time of restarting the operation, may be set to be the same value, or the latter may be set at a value slightly higher than the former.

By the arrangement of the present invention as described so far, operation of the DC-AC converting section 4 in a state of low efficiency may be avoided, and thus, the power loss at the DC-AC converting arrangement 9 is reduced, while wasteful power consumption in the non-load operation can be completely eliminated. Furthermore, since the DC-AC converting arrangement 9 is operated at high efficiency at all times, with the electric power from the solar cell array 1 produced during suspension of operation of the DC-AC converting arrangement 9 being stored in the storage battery 3, the solar share of the electric power by the photovoltaic system to the load 6 becomes very large.

It should be noted here that, in the foregoing embodiment, the detector 7 described as detecting the value of power produced by the DC-AC converting section 4 in the above embodiment may be so modified as to detect the current value instead of the power value, or the DC-AC converting efficiency may be obtained based on power factor and input voltage through employment of the output-efficiency characteristics.

As is clear from the foregoing description, according to the present invention, it becomes possible to efficiently utilize the electric power obtained by the photovoltaic system, and thus, a photovoltaic system suitable for actual applications may be presented for operation at high efficiency.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a power supply system for supplying power to a load by switching between a commercial power source and a photovoltaic system, a DC-AC converting arrangement comprising:

a DC-AC converting section for producing an output by subjecting a DC electric power from a solar cell array to a DC-AC conversion, said DC-AC converting section having a higher converting efficiency when its output voltage is high;

detecting means for sensing an output voltage of said DC-AC converting section;

operation control means, coupled to said DC-AC converting section, for stopping operation of said DC-AC converting section at a time point when the output voltage of said DC-AC converting section, sensed by said detecting means, is lower than a predetermined reference value below which said DC-AC converting section functions at a reduced efficiency; and switch means, responsive to the stopping of the operation of said DC-AC converting section, for immediately supplying the commercial power to the load.

2. A DC-AC converting arrangement as claimed in claim 1, further comprising a charge-discharge control unit providing DC electric power from said solar cell array to said DC-AC converting section and also to a storage battery connected between said charge-discharge control unit and said DC-AC converting section.

3. A system providing alternating current (AC) power to a load from direct current (DC) power produced by a solar cell array or from a commercial power supply developing a commercial power output, comprising:

means for converting the DC power into an AC power output;

switching means for selectively applying said AC power output or a commercial power output to a load;

means for detecting a voltage of said AC power output produced by said means for converting; and operation control means, connected to said means for detecting, for comparing the detected voltage of the AC power output to a reference value and applying a suspension signal to said means for converting when the detected AC power output falls below said reference value, said suspension signal halting operation of said means for converting;

said switching means being responsive to the halting of operation of said means for converting in response to said suspension signal to immediately convert said commercial power supply to said load.

4. The system of claim 3, further comprising a charge-discharge control unit providing the DC power from the solar cell array to said means for converting and to a storage battery connected between said charge-discharge control unit and the solar cell array.

* * * * *